(12) United States Patent
Yu et al.

(10) Patent No.: US 11,959,015 B2
(45) Date of Patent: Apr. 16, 2024

(54) DOUBLE-RESPONSE SELF-DEGRADABLE TEMPORARY PLUGGING AGENT AND PREPARATION METHOD THEREOF

(71) Applicant: Yangtze University, Jingzhou (CN)

(72) Inventors: Xiaorong Yu, Jingzhou (CN); Huan Yang, Jingzhou (CN); Kailu Wang, Jingzhou (CN); Wei Wang, Jingzhou (CN)

(73) Assignee: Yangtze University, Jingzhou (CN)

( * ) Notice: Subject to any disclaimer, the term of this patent is extended or adjusted under 35 U.S.C. 154(b) by 208 days.

(21) Appl. No.: 17/341,504

(22) Filed: Jun. 8, 2021

(65) Prior Publication Data

US 2021/0380865 A1 Dec. 9, 2021

(30) Foreign Application Priority Data

Jun. 8, 2020 (CN) .......................... 202010510595.0

(51) Int. Cl.

| | | |
|---|---|---|
| C04B 14/06 | (2006.01) | |
| C04B 14/28 | (2006.01) | |
| C04B 14/30 | (2006.01) | |
| C04B 16/02 | (2006.01) | |
| C04B 22/14 | (2006.01) | |
| C04B 24/04 | (2006.01) | |
| C04B 24/26 | (2006.01) | |
| C04B 26/06 | (2006.01) | |
| C04B 26/08 | (2006.01) | |
| C09K 8/508 | (2006.01) | |
| C04B 103/10 | (2006.01) | |
| C04B 103/40 | (2006.01) | |

(52) U.S. Cl.
CPC ............ C09K 8/5083 (2013.01); C04B 14/06 (2013.01); C04B 14/28 (2013.01); C04B 14/305 (2013.01); C04B 16/02 (2013.01); C04B 22/14 (2013.01); C04B 22/147 (2013.01); C04B 24/04 (2013.01); C04B 24/2623 (2013.01); C04B 24/2652 (2013.01); C04B 26/06 (2013.01); C04B 26/08 (2013.01); C04B 2103/10 (2013.01); C04B 2103/408 (2013.01); C09K 2208/10 (2013.01)

(58) Field of Classification Search
CPC .. C09K 8/5083; C09K 2208/10; C09K 8/426; C09K 8/44; C09K 8/512; C09K 8/508; C09K 8/5086; C04B 14/06; C04B 14/28; C04B 14/305; C04B 16/02; C04B 22/14; C04B 22/147; C04B 24/04; C04B 24/2623; C04B 24/2652; C04B 26/06; C04B 26/08; C04B 2103/10; C04B 2103/408; C04B 2111/00008; C04B 26/04; C08F 220/56; C08F 283/065
See application file for complete search history.

(56) References Cited

FOREIGN PATENT DOCUMENTS

| CN | 106010491 A | * | 10/2016 | |
|---|---|---|---|---|
| CN | 110003870 A | * | 7/2019 | |
| CN | 111218260 A | * | 6/2020 | ........ C08F 222/1006 |

* cited by examiner

*Primary Examiner* — Kumar R Bhushan

(74) *Attorney, Agent, or Firm* — Troutman Pepper Hamilton Sanders LLP; Christopher C. Close, Jr.

(57) ABSTRACT

Disclosed are a double-response self-degradable temporary plugging agent and a preparation method thereof. The double-response self-degradable temporary plugging agent is prepared by compounding a crosslinkable monomer with a temperature-sensitive degradability and an inorganic material with an acid solubility with a first monomer, a dispersant, an initiator and water, and subjecting the resulting mixture to a polymerization.

12 Claims, 2 Drawing Sheets

DOUBLE-RESPONSE SELF-DEGRADABLE TEMPORARY PLUGGING AGENT AND PREPARATION METHOD THEREOF

CROSS REFERENCE TO RELATED APPLICATION

This patent application claims the benefit and priority of Chinese Patent Application No. 202010510595.0 filed on Jun. 8, 2020, the disclosure of which is incorporated by reference herein in its entirety as part of the present application.

TECHNICAL FIELD

The present disclosure relates to a double-response self-degradable temporary plugging agent and a preparation method thereof.

BACKGROUND ART

In the drilling and oil recovery process, general acid injection is often used in an acidizing process, during which, a large amount of acid liquid enters high permeability layers such as large pore channels and cracks, causing problems of excessive acidification and acid fingering, while a small amount of acid liquid enters low permeability layers that need to be acidized, making it difficult to modify the low permeability layers. For this reason, during in-situ construction, a temporary plugging agent is usually injected into the stratum before injecting an acid liquid, and after the temporary plugging agent reaches the reservoir, it will preferentially enter the high permeability layers and plugs them, thereby increasing the injection pressure, forcing the subsequently injected acid liquid to medium and low permeability layers, and achieving the purpose of uniform acidification. After the acidification is completed, the temporary plugging agent needs to be rapidly degraded without polluting the reservoir.

Currently, temporary plugging agents widely used at home and abroad are made from a particle material and a fiber material capable of rapidly forming a "filter screen structure". Among them, the fiber temporary plugging agent tends to aggregate into a mass, causing pipeline plugging, and it has a low strength and thus is easy to drift, resulting in inconvenience in construction; the particle temporary plugging agent itself has a high strength, but it is difficult to form a filter cake with a high strength, and thus it has a low plugging strength. In addition, although the temporary plugging agent adopting the fiber and particle composite system has the advantages of both, the subsequent plugging removal process is complicated, the temporary plugging agent material could not be completely degraded, and it is easy to form residues, which would cause a great damage to the reservoir.

SUMMARY

In view of the above problems, it is necessary to provide a novel double-response self-degradable temporary plugging agent and a preparation method thereof. The double-response self-degradable temporary plugging agent could satisfy the requirements for high plugging strength during temporary plugging acidification construction, and also could be degraded completely and dissolved in oil or water after the completion of construction, thereby reducing damage to the reservoir and improving the effect of temporary plugging acidification modification.

The present disclosure provides a double-response self-degradable temporary plugging agent, which is prepared by polymerization of raw materials comprising, in parts by weight, 10-35 parts of a monomer, 0.8-7 parts of a reinforcing agent, 0.1-0.8 parts of a dispersant, 0.01-0.2 parts of an initiator and 60-90 parts of water, wherein the monomer comprises a first monomer and a second monomer, wherein the first monomer is at least one selected from the group consisting of a propylene monomer, a styrene monomer, itaconic acid, acrylic acid and maleic anhydride, and the second monomer is a temperature-sensitive degradable crosslinkable monomer, being at least one selected from the group consisting of 1,4-butanediol dimethacrylate, ethylene dimethacrylate and poly(ethylene glycol) diacrylate; the reinforcing agent is an acid-sensitive inorganic material.

The present disclosure further provides a method for preparing the double-response self-degradable temporary plugging agent, comprising:

weighing each raw material according to the composition of the above double-response self-degradable temporary plugging agent; dissolving the first monomer, the second monomer, the dispersant, the reinforcing agent and the initiator in water to obtain a mixture, and subjecting the mixture to a polymerization at a temperature of 30-70° C. for 1-3 hours, to obtain a jellylike product; drying and crushing the jellylike product, to obtain the double-response self-degradable temporary plugging agent.

The present disclosure further provides another double-response self-degradable temporary plugging agent, which is prepared by polymerization of raw materials comprising, in parts by weight, 12-32 parts of a monomer, 1-5 parts of a reinforcing agent, 0.1-0.6 parts of a dispersant, 0.07-0.12 parts of an initiator, 2-10 parts of a hydrophobic nano-powder and 60-90 parts of water, wherein the monomer comprises a first monomer and a second monomer, wherein the first monomer is at least one selected from the group consisting of a propylene monomer, a styrene monomer, itaconic acid, acrylic acid and maleic anhydride, and the second monomer is a temperature-sensitive degradable crosslinkable monomer, being at least one selected from the group consisting of 1,4-butanediol dimethacrylate, ethylene dimethacrylate and poly(ethylene glycol) diacrylate; the reinforcing agent is an acid-sensitive inorganic material.

The present disclosure further provides a method for preparing the another double-response self-degradable temporary plugging agent, comprising:

weighing each raw material according to the composition of the above another double-response self-degradable temporary plugging agent; dissolving the first monomer, the second monomer, the dispersant, the reinforcing agent, the hydrophobic nano-powder and the initiator in water to obtain a liquid mixture, and stirring the liquid mixture at a rate of 3000-20000 r/min for 0.5-5 min, to obtain a dried mixture; subjecting the dried mixture to a polymerization at a temperature of 30-60° C. to obtain the double-response self-degradable temporary plugging agent. In such preparation method, a powder double-response self-degradable temporary plugging agent is formed by direct polymerization through a "liquid-in-solid" microreactor method, and the method has a simple process and saves the cost.

In some embodiments, the hydrophobic nano-powder is at least one selected from the group consisting of a hydrophobic nano-$SiO_2$, a hydrophobic nano-$TiO_2$ and other hydrophobic nano-powders.

In some embodiments, the first monomer is at least one selected from the group consisting of acrylamide, 2-acrylamide-2-methylpropanesulfonic acid, sodium methylallyl sulfonate, methacrylatoethyl trimethyl ammonium chloride, sodium p-styrenesulfonate, diallyldimethylammonium chloride, itaconic acid, acrylic acid and maleic anhydride.

In some embodiments, the dispersant is at least one selected from the group consisting of a poly(vinyl alcohol), a polyacrylamide, a partially hydrolyzed polyacrylamide and a salt-resistant polyacrylamide.

In some embodiments, the reinforcing agent is at least one selected from the group consisting of a soluble starch, a nano-calcium carbonate, a chitosan and calcium stearate.

In some embodiments, the poly(ethylene glycol) diacrylate is at least one selected from the group consisting of polyethylene glycol (200) diacrylate, polyethylene glycol (400) diacrylate and polyethylene glycol (600) diacrylate.

In some embodiments, the initiator is at least one selected from the group consisting of ammonium persulfate, potassium persulfate, sodium thiosulfate, sodium bisulfate and 2,2'-azobis(2-methylpropionamidine) dihydrochloride.

The present disclosure has the following beneficial effects:

Compared with the existing temporary plugging agents made of particle materials and fiber materials, the double-response self-degradable temporary plugging agent according to the present disclosure, being prepared by compounding a crosslinkable monomer with a temperature-sensitive degradablity and an inorganic material with an acid solubility with a first monomer, a dispersant, an initiator and water, and then polymerizing, has degradation characteristics response to both temperature and pH, and also has a high plugging strength. In addition, the degradation time of the temporary plugging agent according to the present disclosure could be adjusted by adjusting the types and contents of the raw materials such as the self-degradable crosslinkable monomer and the reinforcing agent. The double-response self-degradable temporary plugging agent according to the present disclosure could be applied to the fields such as temporary plugging shielding in drilling, temporary plugging acidification, temporary plugging acid fracturing and temporary plugging repeated fracturing.

When using the temporary plugging agent according to the present disclosure, the temporary plugging agent is carried into the stratum by an injected water, and preferentially enters and plugs the high permeability layers; when the temperature reaches the decomposition temperature of the self-degradable crosslinkable monomer, the temporary plugging agent will be degraded, resulting in that its plugging action will be weakened or even disappeared; while the reinforcing agent is an acid-sensitive inorganic material, under the action of a subsequent acid liquid, the reinforcing agent being the acid-sensitive inorganic material will be dissolved and failure, so as to realize the temporary plugging action, and it could be completely degraded and dissolved in oil or water after the completion of construction, thus effectively reducing the damage to the reservoir.

DETAILED DESCRIPTION OF THE EMBODIMENTS

The principles and features of the present disclosure will be described below with reference to the accompanying drawings, and the examples are only used to explain the present disclosure, but not to limit the scope of the present disclosure. Unless otherwise defined, all technical and scientific terms used herein have the same meanings as commonly understood by those skilled in the art.

Raw Materials

Polyethylene glycol (200) diacrylate and polyethylene glycol (600) diacrylate were purchased from Shanghai King Chemical Co., Ltd., China, with a weight-average molecular weight of 400-800.

Salt-resistant polyacrylamide was purchased from Beijing Hengju Chemical group Co., Ltd., China, with a weight-average molecular weight of 25 million and a hydrolysis degree of 30%.

Ethylene dimethacrylate was purchased from Jinan Jinrihe Chemical Co., Ltd., China.

1,4-Butanediol dimethacrylate was purchased from Fushun Anxin Chemistry Co., Ltd., China, with a content of 99.0%.

Polyacrylamide was purchased from Aladdin, with a weight-average molecular weight of 15 million and a hydrolysis degree of lower than 1%.

Ethylene dimethacrylate was purchased from Jinan Jinrihe Chemical Co., Ltd., China.

Poly(vinyl alcohol) 2488 was purchased from Henan Mingcheng Chemical Co., Ltd., China, with a weight-average molecular weight of 101200-110000.

Salt-resistant polyacrylamide KYPAM was purchased from Beijing Hengju Chemical group Co., Ltd., China, with a weight-average molecular weight of 19-22 million and a hydrolysis degree of 25-30%.

Hydrophobic $SiO_2$-GW100 was purchased from Jiangxi Huiming Chemical Co., Ltd., China, with a specific surface area of 207 $m^2/g$.

Hydrophobic $TiO_2$ was purchased from Xuancheng Jing Rui New Material Co., Ltd., with an average particle diameter of 30 nm.

Hydrophobic $SiO_2$-D10 was purchased from Evonik Degussa, with a specific surface area of 90 $m^2/g$.

Other regents were conventional commercial products.

Example 1

The present example provided a double-response self-degradable temporary plugging agent, the raw materials composition of which was shown in Table 1 below:

TABLE 1

The raw materials composition of the double-response self-degradable temporary plugging agent according to Example 1

| Composition | Name of the specific raw materials | Amount |
|---|---|---|
| Monomer | Acrylamide | 25 g |
|  | Polyethylene glycol (200) diacrylate (with an average molecular weight of 600) | 0.2 g |
| Dispersant | Salt-resistant polyacrylamide | 0.15 g |
| Reinforcing agent | Nano-calcium carbonate | 3 g |
| Initiator | Potassium persulfate | 0.08 g |
|  | Sodium bisulfite | 0.04 g |
| Water | Deionized water | 80 g |

The method for preparing the double-response self-degradable temporary plugging agent of the present example was performed according to the following procedures:

Step 1: each raw material was weighted according to Table 1.

Figure 1:
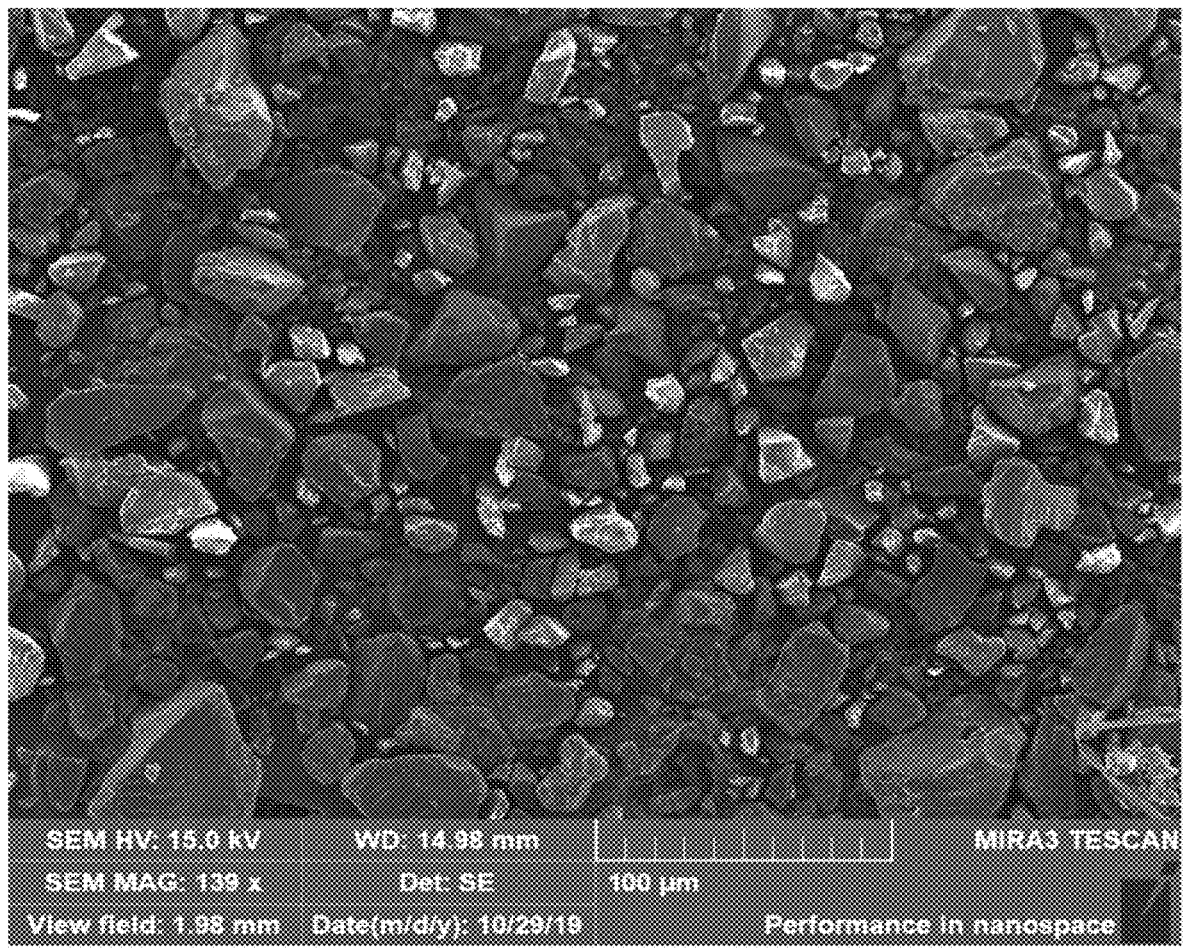
FIG. 1 shows a micrograph of the double-response self-degradable temporary plugging agent according to Example 1 of the present disclosure.

Step 2: the monomer, the dispersant, the reinforcing agent and the initiator were added into water to obtain a liquid mixture, and the liquid mixture was placed in a water bath and polymerized at a temperature of 35° C. for 2 h, to obtain a jellylike product; the jellylike product was cut into pieces, put into an oven and dried at 50° C., and then crushed, obtaining a powder temporary plugging agent product. The micro-morphology of the product was detected, and the result was shown in FIG. 1. It can be seen that the product was irregular solid particles with an uneven particle size, and the maximum particle size was about 70-80 μm, the minimum particle size was about 20-30 μm, and the average particle size was about 60 μm.

Example 2

The present example provided a double-response self-degradable temporary plugging agent, the raw materials composition of which was shown in Table 2 below:

TABLE 2

The raw materials composition of the double-response self-degradable temporary plugging agent according to example 2

| Composition | Name of the specific raw materials | Amount |
|---|---|---|
| Monomer | Acrylamide | 10 g |
| | Acrylic acid | 3 g |
| | 1,4-Butanediol dimethacrylate | 0.3 g |
| Dispersant | Polyacrylamide | 0.3 g |
| Reinforcing agent | Soluble starch | 2 g |
| Initiator | Ammonium persulfate | 0.06 g |
| | Sodium bisulfite | 0.045 g |
| Water | Deionized water | 85 g |

The method for preparing the double-response self-degradable temporary plugging agent of the present example was basically the same as that in Example 1.

Example 3

The present example provided a double-response self-degradable temporary plugging agent, the raw materials composition of which was shown in Table 3 below:

TABLE 3

The raw materials composition of the double-response self-degradable temporary plugging agent according to Example 3

| Composition | Name of the specific raw materials | Amount |
|---|---|---|
| Monomer | Acrylamide | 25 g |
| | 2-Acrylamide-2-methylpropanesulfonic acid | 5 g |
| | Ethylene dimethacrylate | 1 g |
| Dispersant | Poly(vinyl alcohol) 2488 | 0.5 g |
| Reinforcing agent | Chitosan | 1 g |
| Initiator | Ammonium persulfate | 0.06 g |
| | Sodium bisulfite | 0.045 g |
| Water | Deionized water | 70 g |

The method for preparing the double-response self-degradable temporary plugging agent of the present example was basically the same as that in Example 1.

Example 4

The present example provided a double-response self-degradable temporary plugging agent, the raw materials composition of which was shown in Table 4 below:

TABLE 4

The raw materials composition of the double-response self-degradable temporary plugging agent according to Example 4

| Composition | Name of the specific raw materials | Amount |
|---|---|---|
| Monomer | Acrylamide | 20 g |
| | Sodium p-styrenesulfonate | 1 g |
| | Polyethylene glycol (200) diacrylate (with an average molecular weight of 400) | 0.3 g |
| Dispersant | Salt-resistant polyacrylamide KYPAM | 0.2 g |
| Reinforcing agent | Nano-calcium carbonate | 5 g |
| Hydrophobic nano-powder | Hydrophobic $SiO_2$-GW100 | 3 g |
| Initiator | Ammonium persulfate | 0.036 g |
| | Sodium bisulfite | 0.03 g |
| Water | Deionized water | 79 g |

The method for preparing the double-response self-degradable temporary plugging agent of the present example was performed according to the following procedures:

Step 1, each raw material was weighted according to Table 4.

Figure 2:
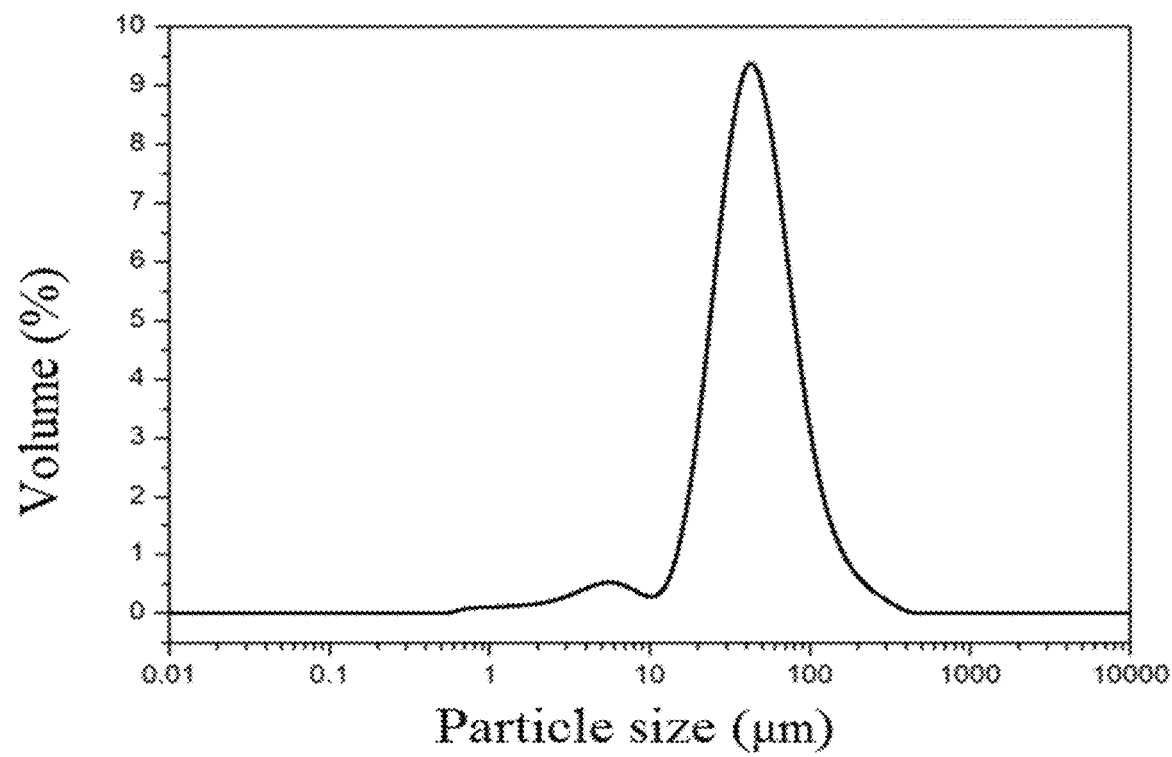
FIG. 2 is a diagram illustrating particle size test of the double-response self-degradable temporary plugging agent according to Example 4 of the present disclosure.

Step 2, the monomer, the dispersant, the reinforcing agent, the hydrophobic nano-powder and the initiator were added into water to obtain a liquid mixture, the liquid mixture was stirred at 10000 r/min for 100 s, and then placed in a water bath and polymerized at 35° C. for 2.5 hours, obtaining a powder temporary plugging agent product. The particle size distribution of the product was shown in FIG. 2, and the average particle size thereof was 20.6 μm.

Example 5

The present example provided a double-response self-degradable temporary plugging agent, the raw materials composition of which was shown in Table 5 below:

TABLE 5

The raw materials composition of the double-response self-degradable temporary plugging agent according to Example 5

| Composition | Name of the specific raw materials | Amount |
|---|---|---|
| Monomer | Acrylamide | 30 g |
| | Itaconic acid | 5 g |
| | Ethylene dimethacrylate | 0.5 g |
| Dispersant | Salt-resistant polyacrylamide KYPAM | 0.2 g |
| Reinforcing agent | Calcium stearate | 2 g |
| Hydrophobic nano-powder | Hydrophobic $SiO_2$-D10 | 5 g |
| Initiator | Potassium persulfate | 0.05 g |
| | Sodium bisulfite | 0.036 g |
| Water | Deionized water | 65 g |

The method for preparing the double-response self-degradable temporary plugging agent of the present example was basically the same as that in Example 4.

Example 6

The present example provided a double-response self-degradable temporary plugging agent, the raw materials composition of which was shown in Table 6 below:

TABLE 6

The raw materials composition of the double-response self-degradable temporary plugging agent according to Example 6

| Composition | Name of the specific raw materials | Amount |
|---|---|---|
| Monomer | Acrylamide | 15 g |
| | Methacrylatoethyl trimethyl ammonium chloride | 2 g |
| | polyethylene glycol (600) diacrylate (with an average molecular weight of 800) | 0.7 g |
| Dispersant | Salt-resistant polyacrylamide KYPAM | 0.2 g |
| Reinforcing agent | Chitosan | 2.5 g |
| Hydrophobic nano-powder | Hydrophobic $TiO_2$ | 7 g |
| Initiator | Potassium persulfate | 0.05 g |
| | Sodium bisulfite | 0.036 g |
| Water | Deionized water | 85 g |

The method for preparing the double-response self-degradable temporary plugging agent of the present example was basically the same as that in Example 4.

Performance Test

1. Degradability in Acid 0.5 g of the temporary plugging agents of Examples 1 to 3 were respectively added into 15% HCl for degradation test. The degradation results at 60° C., 70° C., 80° C., 90° C. and 120° C. were observed.

0.5 g of the temporary plugging agents of Examples 4 to 6 were added into a mixed acid solution of 12% HCl and 3% HF for degradation test. The degradation results at 60° C., 70° C., 80° C. and 90° C. were observed. The time required for complete degradation under different temperature conditions was shown in Table 7 below:

TABLE 7

Statistical table of results of acid degradation test

| | Time required for complete degradation under different temperature conditions (h) | | | | |
|---|---|---|---|---|---|
| Example No. | 60° C. | 70° C. | 80° C. | 90° C. | 120° C. |
| Example 1 | 240 | 128 | 96 | 48 | 2.5 |
| Example 2 | 248 | 132 | 103 | 46 | 3 |
| Example 3 | 235 | 125 | 90 | 42 | 2 |
| Example 4 | 255 | 134 | 108 | 50 | 2.5 |
| Example 5 | 260 | 138 | 110 | 56 | 3.5 |
| Example 6 | 266 | 140 | 115 | 58 | 4.5 |

It can be seen from Table 7 that the temporary plugging agents of Examples 1-6 could be degraded in HCl or mixed acid of 12% HCl and 3% HF, and the higher the temperature, the faster the degradation.

2. Plugging Performance Test

The plugging performance and damage performance of the temporary plugging agents of Examples 1-6 to fractured cores with a crack width of 0.5 mm were investigated by a single-tube core physical model experiment.

The specific experimental process were as follows:

(1) the fractured core was dried at a low temperature, and the diameter, length, dry weight and fracture width of the core were measured;

(2) the core were loaded into a core holder, and a simulated formation water was injected thereto at a certain flow rate by a constant-flux pump until the pressure was stable, wherein the composition of the simulated formation water were shown in Table 8; the flow rate and pressure were recorded to calculate a permeability $K_1$;

TABLE 8

Composition of the simulated formation water

| Concentration of ions contained therein (mg/L) | | | | | | | Total salinity (mg/L) |
|---|---|---|---|---|---|---|---|
| $K^+ + Na^+$ | $Ca^{2+}$ | $Mg^{2+}$ | $Cl^-$ | $SO_4^{2-}$ | $HCO_3^{2-}$ | $CO_3^{2-}$ | |
| 4059.3 | 163.2 | 150.5 | 4294.5 | 1587.8 | 1510.9 | 36.7 | 11802.9 |

(3) 0.4 PV of the temporary plugging agent was injected to the fractured cores and aged at 60° C. for 3 days, and a water flooding was carried out until the pressure was stable; the flow rate and pressure were recorded to calculate a permeability $K_2$; a plugging rate η was calculated according to $η=(K_1-K_2)/K_1 \times 100\%$, and the results were shown in Table 9:

TABLE 9

Statistical table of results of the plugging test

| | Permeability/μm² | | Plugging | Breakthrough |
|---|---|---|---|---|
| Example No. | $K_1$ | $K_2$ | rate η/% | pressure/MPa |
| Example 1 | 1.40 | 0.26 | 81.23 | 5.1 |
| Example 2 | 1.72 | 0.50 | 70.71 | 4.5 |
| Example 3 | 1.64 | 0.21 | 86.90 | 5.8 |
| Example 4 | 1.59 | 0.29 | 82.44 | 4.8 |
| Example 5 | 1.51 | 0.27 | 80.2 | 5.5 |
| Example 6 | 1.61 | 0.15 | 90.6 | 6.3 |

It can be seen from Table 8 that the plugging rate of the temporary plugging agents of Examples 1-6 to fractured cores reached over 70%, and that of Example 6 reached over 90%, showing that the temporary plugging agents have good plugging ability.

3. Damage Performance Test

Damage performance test was performed by a method similar to that for plugging performance test, except that the water flooding in step (2) was replaced with acid injection (15% HCl), followed by a water flooding, and then a permeability $K_3$ was calculated.

Damage rate R was calculated according to $R=(K_1-K_3)/K_1 \times 100\%$, and the statistical results were shown in Table 9:

TABLE 10

Statistical table of results of damage test to core

| | Permeability/μm² | | |
|---|---|---|---|
| Example No. | $K_1$ | $K_3$ | Damage rate/% |
| Example 1 | 1.42 | 1.35 | 5.23 |
| Example 2 | 1.83 | 1.70 | 6.71 |
| Example 3 | 1.66 | 1.54 | 6.90 |
| Example 4 | 1.45 | 1.37 | 5.4 |
| Example 5 | 1.88 | 1.69 | 8.2 |
| Example 6 | 1.68 | 1.60 | 4.6 |

It can be seen from Table 10 that the damage rates of the temporary plugging agents of Examples 1-6 to fractured cores were all below 10%, and the minimum damage rate was only 4.6%, showing that the temporary plugging agents have less damage to cores through self-degradation.

The technical features of the above embodiments could be combined arbitrarily. In order to make the description concise, possible combinations of the technical features in the above embodiments are not all described herein. However, as long as there is no contradiction between the combinations of these technical features, they should be considered as the scope recorded in this specification.

The above embodiments are merely preferred embodiments of the present disclosure, but not intended to limit the present disclosure. Any modifications, equivalent replacements, improvements and the like made within the spirit and principle of the present disclosure should fall within the protection scope of the present disclosure.

What is claimed:

1. A double-response self-degradable temporary plugging agent, which is prepared by polymerization of raw materials comprising, in parts by weight, 32 parts of a monomer, 1-5 parts of a reinforcing agent, 0.1-0.6 parts of a dispersant, 0.07-0.12 parts of an initiator, 2-10 parts of a hydrophobic nano-powder and 60-90 parts of water, wherein the monomer comprises a first monomer and a second monomer, wherein the first monomer is at least one selected from the group consisting of a propylene monomer, a styrene monomer, itaconic acid, acrylic acid and maleic anhydride, and the second monomer is a temperature-sensitive degradable crosslinkable monomer, being at least one selected from the group consisting of 1,4-butanediol dimethacrylate, ethylene dimethacrylate and a poly(ethylene glycol) diacrylate; and the reinforcing agent is an acid-sensitive material.

2. The double-response self-degradable temporary plugging agent as claimed in claim 1, wherein the hydrophobic nano-powder is at least one selected from the group consisting of a hydrophobic nano-$SiO_2$ and a hydrophobic nano-$TiO_2$.

3. The double-response self-degradable temporary plugging agent as claimed in claim 1, wherein the styrene monomer is sodium p-styrenesulfonate.

4. The double-response self-degradable temporary plugging agent as claimed in claim 1, wherein the dispersant is at least one selected from the group consisting of a poly (vinyl alcohol), a polyacrylamide, a partially hydrolyzed polyacrylamide and a salt-resistant polyacrylamide.

5. The double-response self-degradable temporary plugging agent as claimed in claim 1, wherein the reinforcing agent is at least one selected from the group consisting of a soluble starch, a nano-calcium carbonate, a chitosan and calcium stearate.

6. The double-response self-degradable temporary plugging agent as claimed in claim 1, wherein the initiator is at least one selected from the group consisting of ammonium persulfate, potassium persulfate, sodium thiosulfate, sodium bisulfate and 2,2'-azobis(2-methylpropionamidine) dihydrochloride.

7. The double-response self-degradable temporary plugging agent as claimed in claim 2, wherein the styrene monomer is sodium p-styrenesulfonate.

8. The double-response self-degradable temporary plugging agent as claimed in claim 2, wherein the dispersant is at least one selected from the group consisting of a poly (vinyl alcohol), a polyacrylamide, a partially hydrolyzed polyacrylamide and a salt-resistant polyacrylamide.

9. The double-response self-degradable temporary plugging agent as claimed in claim 2, wherein the reinforcing agent is at least one selected from the group consisting of a soluble starch, a nano-calcium carbonate, a chitosan and calcium stearate.

10. The double-response self-degradable temporary plugging agent as claimed in claim 2, wherein the initiator is at least one selected from the group consisting of ammonium persulfate, potassium persulfate, sodium thiosulfate, sodium bisulfate and 2,2'-azobis(2-methylpropionamidine) dihydrochloride.

11. A method for preparing the double-response self-degradable temporary plugging agent as claimed in claim 1, comprising, weighing each raw material according to the composition of the double-response self-degradable temporary plugging agent as claimed in claim 1;

dissolving the first monomer, the second monomer, the dispersant, the reinforcing agent, the hydrophobic nano-powder and the initiator in water to obtain a liquid mixture, and stirring the liquid mixture, to obtain a dried mixture; and subjecting the dried mixture to a polymerization at a temperature of 30-60° C., to obtain a dry powdery microsphere including the double-response self-degradable temporary plugging agent.

12. The method as claimed in claim 11, wherein stirring the liquid mixture is performed at a rate of 3000-20000 r/min for 0.5-5 min.

* * * * *